United States Patent [19]

Lachner et al.

[11] 4,020,137

[45] Apr. 26, 1977

[54] METHOD OF INJECTION MOULDING HOLLOW PREFORMS

[75] Inventors: Otto Lachner, Kempten; Ludwig Beyerlein, Lenzfried; Klaus Spelthahn, Kempten, all of Germany

[73] Assignee: Lever Brothers Company, New York, N.Y.

[22] Filed: June 23, 1975

[21] Appl. No.: 589,316

Related U.S. Application Data

[63] Continuation of Ser. No. 423,953, Dec. 12, 1973, abandoned.

[52] U.S. Cl. ................................ 264/90; 264/89; 264/97; 264/102; 264/DIG. 78; 425/DIG. 60; 425/DIG. 204; 425/DIG. 209
[51] Int. Cl.² ................. B29C 17/07; B29F 1/00
[58] Field of Search ............... 264/89, 90, 92, 94, 264/97, 101, 102, DIG. 78; 425/242 B, 324 B, DIG. 209, 388, DIG. 60, DIG. 204

[56] References Cited

UNITED STATES PATENTS

| 2,790,994 | 5/1957 | Carpot et al. | 264/90 |
| 3,351,983 | 11/1967 | Grigull | 264/102 X |
| 3,412,186 | 11/1968 | Piotrowski | 264/97 X |
| 3,882,213 | 5/1975 | Uhlig | 264/97 |

*Primary Examiner*—Jan H. Silbaugh
*Attorney, Agent, or Firm*—Kenneth F. Dusyn; James J. Farrell; Melvin H. Kurtz

[57] ABSTRACT

In an injection moulding process for forming hollow preforms on a mandrel which is subsequently used as a blowing pin for blowing the preforms to the final shape in a blow mould separation of the preform from the mandrel during cooling of the preform from the injection temperature is prevented by applying a vacuum to the blowing channel in the mandrel before the injection pressure is released.

3 Claims, 1 Drawing Figure

U.S. Patent
April 26, 1977
4,020,137
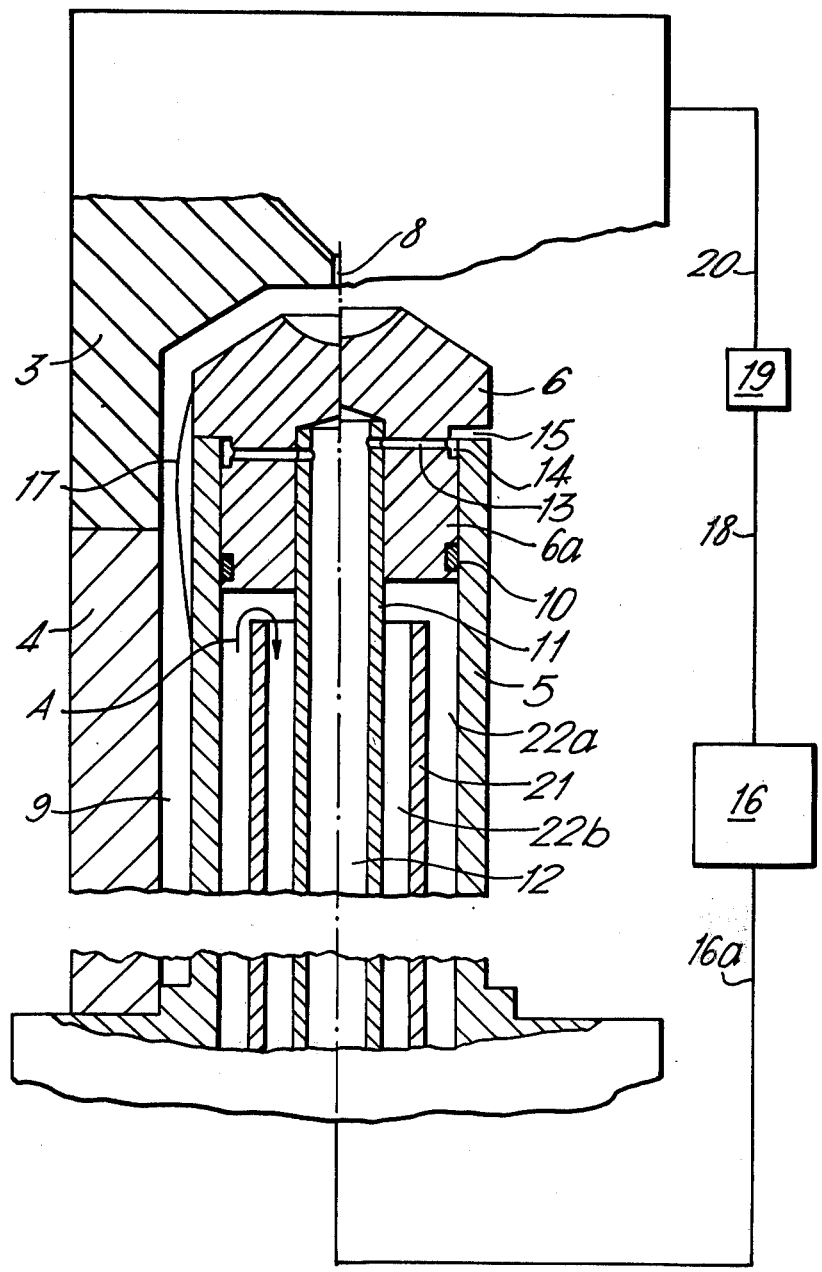

METHOD OF INJECTION MOULDING HOLLOW PREFORMS

This is a continuation of application Ser. No. 423,953, filed Dec. 12, 1973, now abandoned.

This invention relates to a method of injection moulding hollow pre-forms of thermoplastic material and particularly to a method of moulding pre-forms in a multi-station process in which the pre-forms are moulded on a mandrel which carries the pre-forms from the injection moulding station to a blow moulding station where the mandrel forms the blowing pin of the blow moulding operation.

In such a multi-station process, pre-forms of thermoplastic material, particularly of PVC, are produced having a shape, defined by the mandrel and the injection mould, which is designed in accordance with the shape of the hollow article to be blow moulded from the pre-form. It is also necessary that a precisely defined temperature profile of the pre-form, i.e., the temperatures at specific positions of the pre-form, is obtained immediately before blow moulding in order to ensure that an article is properly blown. Temperatures varying from the desired profile, particularly is the temperature is too high, can lead to either the pre-forms bursting during blowing or the end products breaking in use due to undue thinning in particular areas during the blow moulding operation, e.g., if the end products are used to contain carbonated drinks they may burst.

Between the injection moulding station and the blow moulding station the temperature profile of the pre-form is largely influenced by the mandrel since the pre-form is in direct contact with the mandrel. The temperature of the mandrel can also be controlled in order to obtain the desired temperature profile of the pre-form.

It has been found in practice, however, that the pre-form sometimes does not contact the entire surface of the mandrel. This results in insufficient control of the temperature profile of the pre-form since the heat transfer between the mandrel and the pre-form is affected.

Investigations have now shown that the pre-form can separate from the mandrel during cooling of the material from the injection temperature. This is due to the fact that the outside walls of the pre-form in contact with the inside of the injection would cool down more quickly than the inner walls of the pre-form which are in contact with the mandrel. As a result of this difference in the cooling rate, and because no further material is injected into the injection mould, the outer surface of the pre-form touching the inner wall of the mould forms a hard skin. Any shrinkage due to cooling causes a tendency for the material which is still warm to separate from the mandrel.

In order that a mandrel can fulfil the dual purpose of forming a core in the injection mould and a blowing pin in the blowing operation, the mandrel must be provided with a blowing channel which communicates with the outside of the mandrel during the blowing operation. For this purpose it has been proposed to provide the mandrel with a movable tip, the tip being moved to expose a blowing channel when it is required to pass a blowing gas through the mandrel, and moved to close the blowing channel during the injection moulding operation. Because of the necessary working clearances and dust particles etc. the tip, in the closed position, does not, in practice, close the blowing channel in an airtight manner, but allows air to enter between the interior of the pre-form and the exterior surface of the mandrel. As a result, the tendency of the pre-form to separate from the mandrel is favoured by the fact that air can penetrate between the mandrel and the pre-form. Thus, the areas of the pre-form which have a tendency to separate from the mandrel actually do so.

Any idea of controlling the temperature appropriately in the walls of the injection mould and in the mandrel in order to avoid this separation due to the differential rate of cooling of the pre-form must be rejected. These parts of the apparatus are already subject to temperature control in order to produce the temperature profile which the pre-form must have on reaching the blow mould. This rules out such an obvious and promising solution.

According to the present invention there is provided a method of injection moulding a hollow pre-form of thermoplastic material comprising heating the material to the injection temperature, injecting the heated material under pressure through an injection nozzle into a mould having a core formed by a mandrel having a blowing channel communicating with the outside surface of the mandrel, and establishing a pressure drop from the outside to the inside of the pre-form before the injection pressure on the pre-form is released. Preferably the pressure drop is effected by applying a vacuum via the blowing channel to the outside of the mandrel.

The vacuum in the blowing channel ensures that no air penetrates between the interior of the pre-form and the exterior of the mandrel so that any tendency of the pre-form to separate from the mandrel is prevented. Moreover the injected material is sucked into areas where the tendency to separate occurs.

The vacuum in the blowing channel is preferably maintained until the pre-form has completely set. In this way any possibility of the pre-form separating from the mandrel is minimised.

The vacuum is advantageously applied from the time of beginning the injection of the thermoplastic material into the mould. This ensures that the vacuum is always built up at the right time and facilitates injection of the material into the injection mould.

To facilitate even further the injection of the material into the mould the vacuum can be applied before the start of the injection of the material into the mould thereby creating a lower pressure in the mould which tends to assist the entry of the material.

The invention will now be more particularly described with reference to the accompanying diagrammatic drawing which shows a cross-section through a cylindrical mandrel in an injection mould.

The mould comprises an outer sleeve 5 at one end of which is a mandrel tip 6 having a portion 6a secured to a blowing tube 11. The tube 11 and the portion 6a of the tip are provided with radial holes 13 which extend between a blowing channel 12 formed by the inside of the blowing tube and an annular groove 14 in the portion 6a of the mandrel tip. An "O" ring seal 10 is provided between the portion 6a of the tip and the inside of the outer sleeve 5.

As shown at the left hand side of the drawing the tip 6 abuts the end of the outer sleeve 5 and the annular groove 14 is contained within the sleeve. In this position the blowing channel 12 does not communicate positively with the outside of the mandrel, the tip being in the injection moulding condition.

The blowing tube 11 is movable in the axial direction relative to the sleeve 5 to move the tip 6 to a blow moulding condition as shown on the right hand side of the drawing. In this position the annular groove 14 is exposed and the blowing channel 12 is in positive communication with the outside of the mandrel via an annular groove 15 formed between the tip 6 and the end of the sleeve 5.

Also located within the mandrel is a tube 21 co-axial with the blowing tube and the outer sleeve. The tube 21 terminates short of the tip 6 to define passages 22a and 22b in the mandrel, the passages being in communication at the tip end of the mandrel.

As shown in the drawing at an injection moulding station the mandrel is enclosed by a two-part injection mould 3 and 4, the base portion 3 having an injection nozzle 8 through which plasticised thermo-plastic material is injected from the extruder of an injection moulding apparatus into the space 9 between the mandrel and the injection mould.

The mandrel is secured to a turret and can be separated relative to the injection mould to allow the turret to carry the mandrel from the injection moulding station to a blow moulding station where the pre-form, still on the mandrel, is enclosed by a blow mould and blown to a finished shape.

At the blow moulding station the blowing tube can be moved to expose the annular groove 14 and blowing gas is passed through the blowing channel to blow the pre-form through the shape of the blow mould.

The passages 22a and 22b communicate with passages in the turret so that a cooling medium can pass through the passages in the mandrel as indicated by arrow A. The cooling medium assists in cooling the plasticised material from the injection temperature and, together with other cooling means which can be located in the injection mould, greatly influences the temperature profile of the pre-form when it reaches the blow mould.

During cooling of the injection moulded pre-form the cooling agent passing within the mandrel is prevented from reaching the end of the mandrel by the tip. The result is that the outside of the pre-form cools quicker than the inside of the pre-form at that region. A skin is formed on the outside of the pre-form but the thermo-plastic material tends to shrink on further cooling. Thus, once the skin has formed there is a tendency for air to penetrate from the blowing channel 12 to the outside of the mandrel so that the pre-form separates from the mandrel somewhat as shown at 17 in the drawing. This occurs even though the tip is in the closed position since dust and dimensional working clearances prevent the tip closing in an absolutely airtight manner.

As shown in the drawing the blowing channel 12 is connected at the injection moulding station by a pipe 16a to a source of vacuum 16. The functioning of the source of vacuum is controlled by a control device 19 connected to the source of vacuum and the injection moulding apparatus via circuits 18 and 20 respectively.

This control device ensures that the application of vacuum and the maintenance of the vacuum in the blowing channel is initiated and maintained for the desired period of time in relation to the injection process.

The circuits 18 and 20 can be mechanical elements such as levers, electrical elements such as lead wires, or combinations of these or other structural elements.

The vacuum is applied before the injection pressure is released and is preferably maintained until the pre-form has cooled to completely set. If desired the vacuum can be applied even before the injection of the material into the mould begins to facilitate the injection of the material.

Thus any tendency of the pre-form to separate from the mandrel is avoided.

Whilst the drawing shows that the inside wall of the injection mould 3 and 4, and the outside surface of the mandrel as cylindrical it will be appreciated that in practice these surfaces are preferably slightly tapered to facilitate both the withdrawal of the mandrel and pre-form from the injection mould and the removal of the pre-form from the mandrel.

What is claimed is:

1. A method for injection moulding a hollow preform of thermo-plastic material comprising the steps of:
    a. heating the thermo-plastic material to a desired injection moulding temperature;
    b. injecting the heated thermo-plastic material under pressure through an injection nozzle into an injection mould having an annular core cavity formed by the presence of a mandrel having a blowing channel therein and an outlet communicating with the annular core cavity and a valve means displaceable to open and close said outlet to allow a desired intermittent communication between the blowing channel and annular core cavity, said communication being closed throughout the injection moulding of thermo-plastic material;
    c. applying a vacuum within the blowing channel before the injection pressure on the preform is released to prevent leakage of air through the outlet, where not closed in an airtight manner, from the blow channel into the annular core cavity;
    d. maintaining the application of said vacuum within said blowing channel until the preform has completely cooled to set, whereby separation of said preform from said mandrel due to shrinkage is prevented;
    e. removing the hollow preform from the injection mold while being carried on the mandrel; and
    f. adjusting the temperature of the preform to that required for its subsequent processing while the preform is in contact with the mandrel.

2. A method according to claim 1 wherein the mandrel of step (b) has a blowing channel therein and an axially displaceable mandrel tip movable to allow a desired intermittent communication between the blowing channel and annular core cavity.

3. A method according to claim 1 in which the vacuum is applied from the time of beginning the injection of the thermo-plastic material into the mould.

* * * * *

UNITED STATES PATENT AND TRADEMARK OFFICE
CERTIFICATE OF CORRECTION

PATENT NO. : 4,020,137
DATED : April 26, 1977
INVENTOR(S) : Otto Lachner, et al.

It is certified that error appears in the above-identified patent and that said Letters Patent are hereby corrected as shown below:

Title page, below the words: "Continuation of Ser. No. 429,953, Dec. 12, 1973, abandoned", add the following:

-- Foreign Application Priority Data

December 14, 1972 Germany (Fed. Rep.) Application No. 22 61 174 --.

Signed and Sealed this

Third Day of July 1979

[SEAL]

Attest:

LUTRELLE F. PARKER
Attesting Officer  Acting Commissioner of Patents and Trademarks